United States Patent [19]
Furlani

[11] 3,722,545
[45] Mar. 27, 1973

[54] MODULATING BALL VALVE
[75] Inventor: Romeo Furlani, Providence, R.I.
[73] Assignee: International Telephone and Telegraph Corporation, Nutley, N.J.
[22] Filed: Oct. 18, 1971
[21] Appl. No.: 189,857

[52] U.S. Cl. ............137/625.3, 137/625.32, 251/209
[51] Int. Cl. ..............................................F16k 3/32
[58] Field of Search.251/208, 209; 137/625.32, 625.3

[56] References Cited

UNITED STATES PATENTS

| | | |
|---|---|---|
| 3,191,906 | 6/1965 | Zeigler et al. ........................251/208 |
| 3,354,904 | 11/1967 | Federle et al. ......................251/209 X |
| 3,443,591 | 5/1969 | Blanzy et al. ................137/625.32 X |

Primary Examiner—Arnold Rosenthal
Attorney—C. Cornell Remsen, Jr. et al.

[57] ABSTRACT

A modulating ball valve wherein a rotatable plug supported by trunions journalled along an axis transverse to the direction of flow of the fluid to be controlled is provided with an indentation on the surface thereof. The indentation is formed as a plurality of overlapping cones having different base diameters, and it provides, in combination with a circular arc cutout in said plug and a tapered inlet aperture in the casing of said valve, a desired fluid flow characteristic.

10 Claims, 8 Drawing Figures

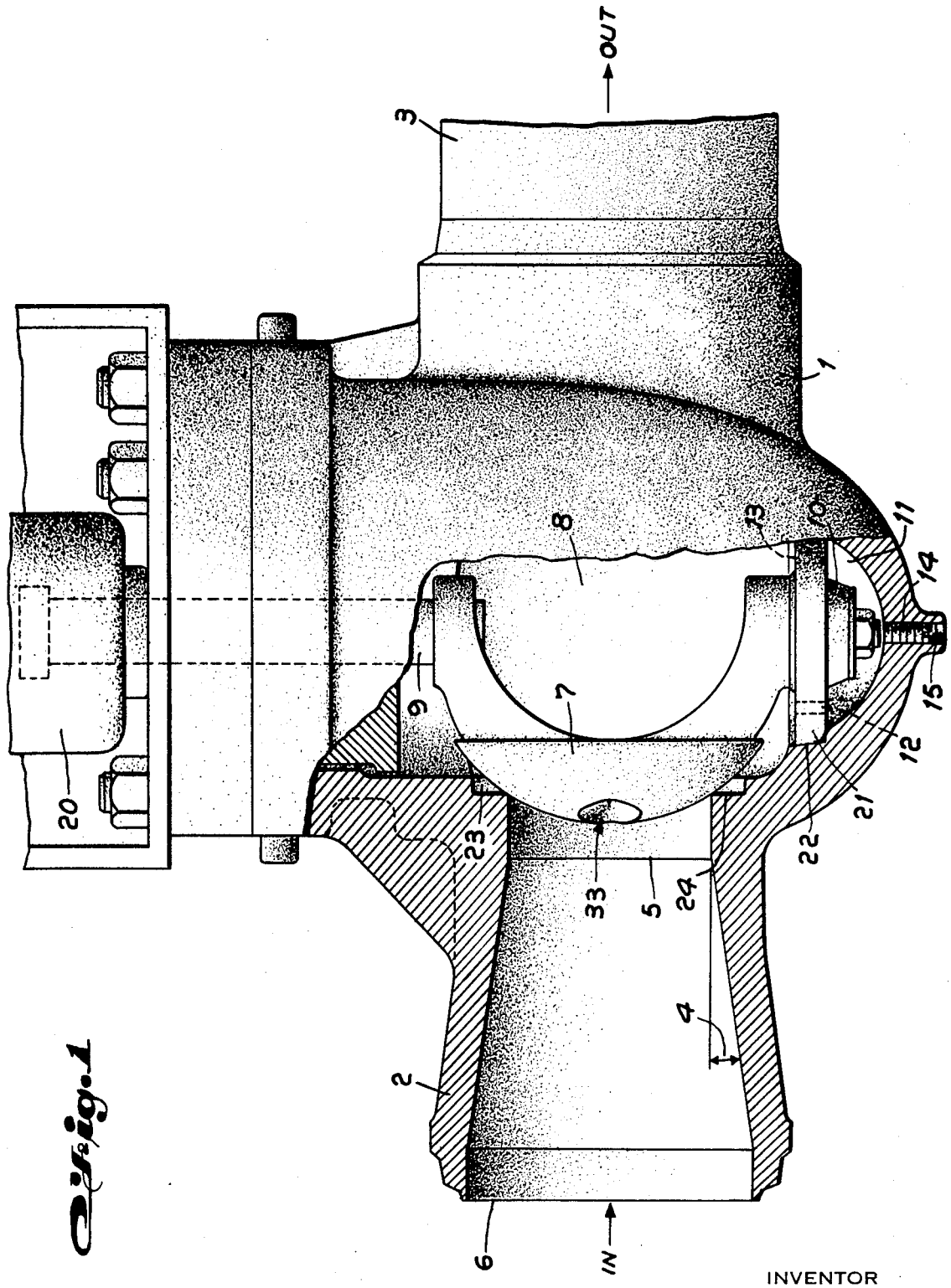

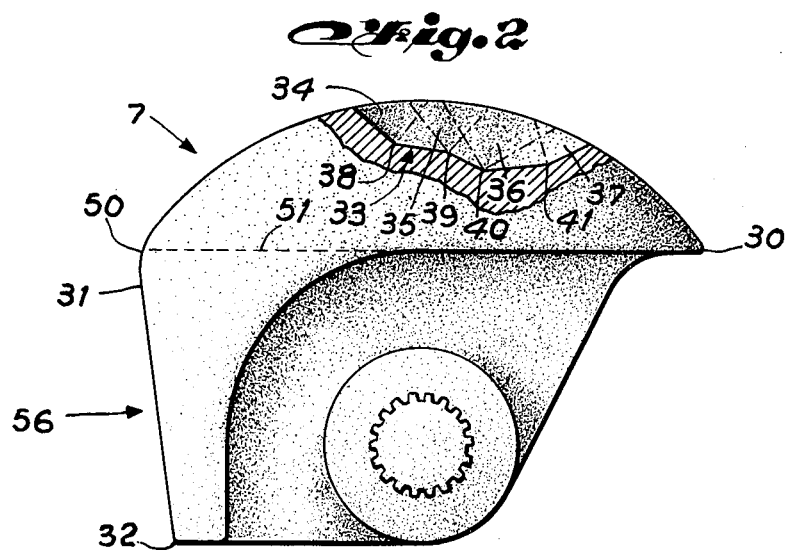
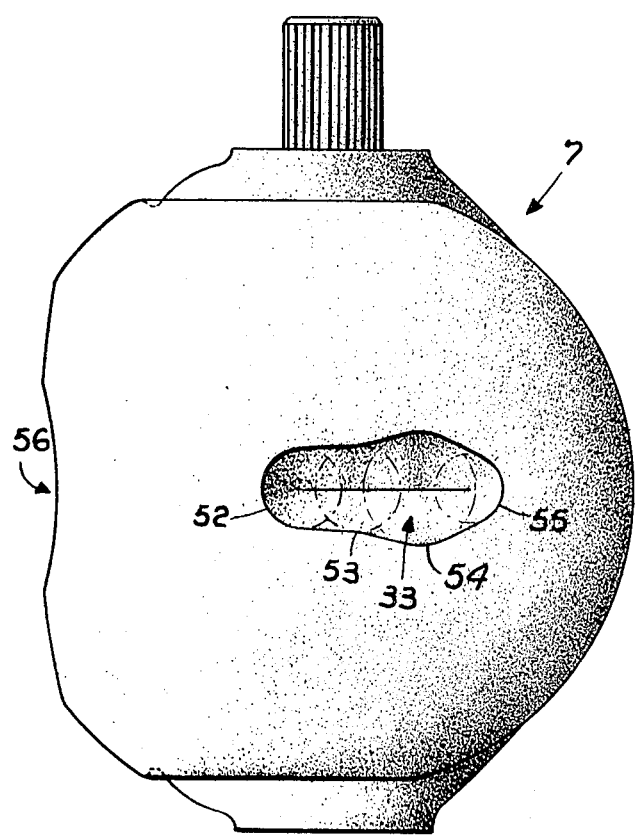
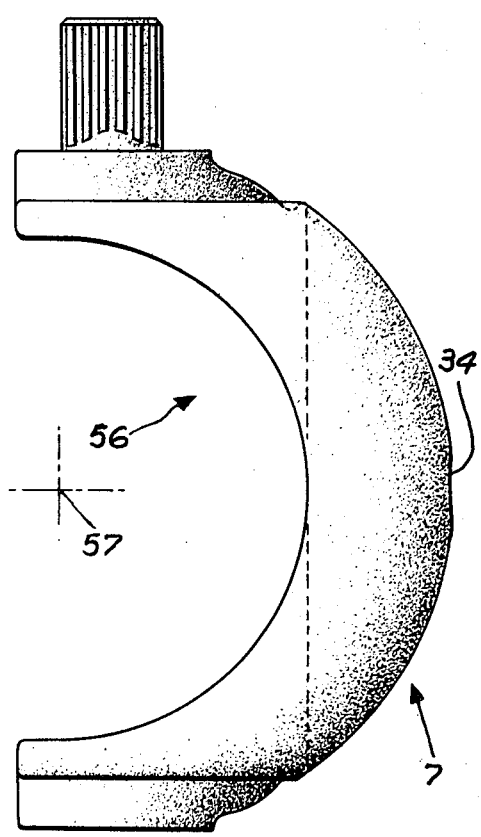

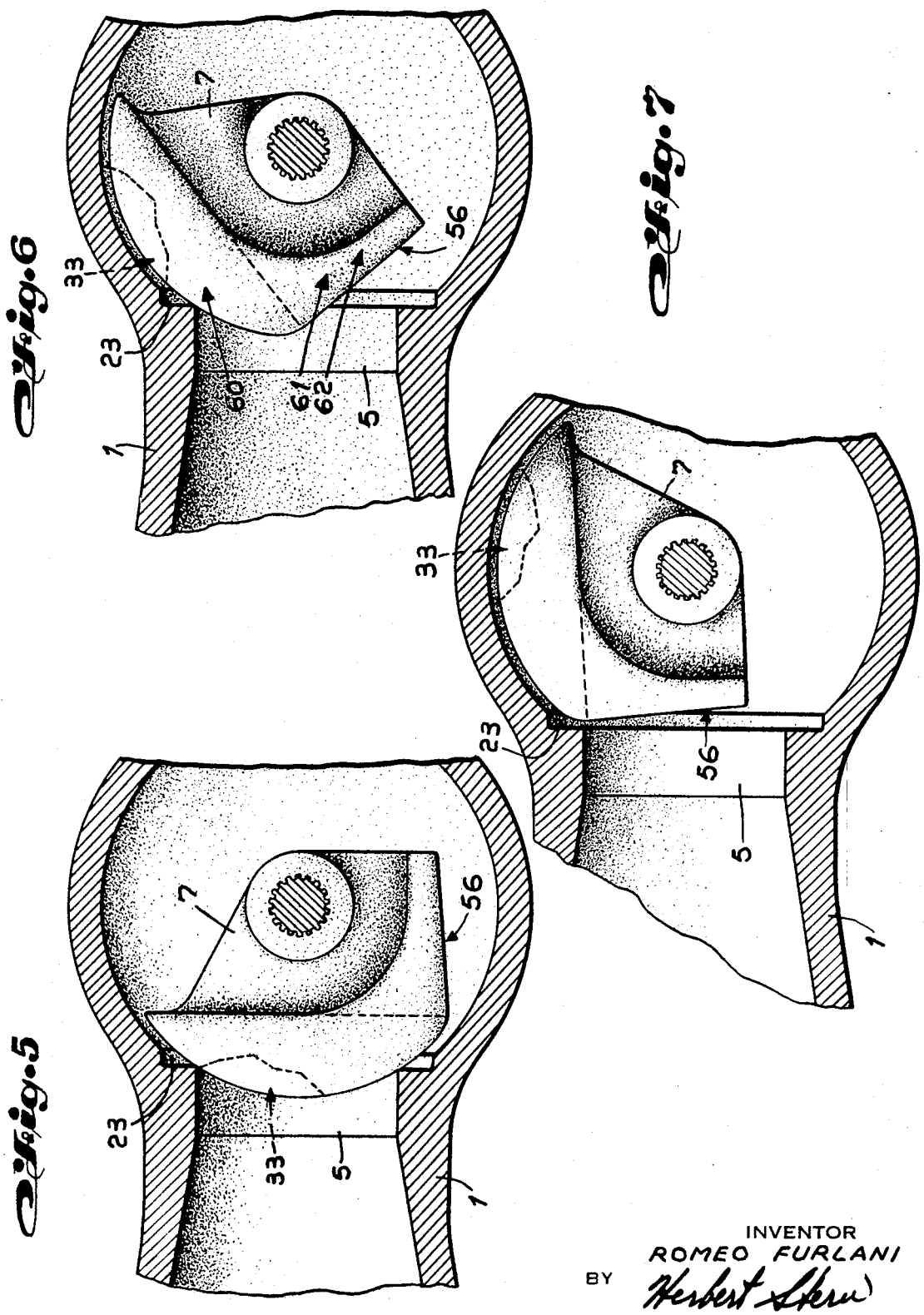

EQUAL PERCENTAGE CHARACTERISTIC

MODULATING BALL VALVE

BACKGROUND OF THE INVENTION

This invention relates to flow control valves of the modulating ball type commonly used to control fluid flow, and more particularly to such a ball valve having and equal percentage characteristic, i.e. one wherein a percentage change in ball travel causes an equal percentage change in the flow volume in all points on the characteristic curve of the valve.

An equal percentage characteristic has a number of useful applications, for example, it may be utilized in the controlling of the recirculating cooling water of a nuclear reactor. Apparatus known in the art for controlling a nuclear reactors recirculating cooling water usually includes a pair of variable speed pump motor-generator sets so as to provide a particular flow rate and volume under varying conditions of time, temperature and power load. Notwithstanding the great expense involved in providing such variable speed pump motor-generator sets, it has been found that the accuracy of response of such pumps and flow speeds and volume may not be as finely controlled as desired. Further, with the advent of newer, larger nuclear reactors, the pressures and volumes of fluid flow required for the recirculation of cooling water for said reactors requires pumps which are extremely large and which are therefore very expensive.

SUMMARY OF THE INVENTION

Therefore, the main object of the invention is to provide a modulating ball valve having an equal percentage characteristic.

A further object of this invention is to provide such a modulating ball valve adapted to control the recirculating cooling water utilized in a nuclear reactor.

It is another object of this invention to provide such a valve which will allow more precise control of the pressure, rate of flow and volume of said cooling water.

It is yet another object of this invention to provide such a flow control device which is substantially smaller and less expensive than devices presently used for comparable purposes.

According to the present invention there is provided a modulating ball valve comprising a valve casing having an inlet aperture and an outlet aperture formed therein, and a ball plug having an indentation formed therein rotatably mounted within said casing, said indentation being formed by a plurality of overlapping conical cavities of different diameters, whereby the presentation of different portions of said indentation to the periphery of said inlet aperture varies the flow through said valve.

Further objects and features of this invention will become more apparent by reference to the following description taken in conjunction with the accompanying drawings in which:

BRIEF DESCRIPTION OF THE DRAWINGS

FIG. 1 is a partially cut-away view of a modulating ball valve structure according to the invention;

FIG. 2 is a side view of a ball plug according to the invention;

FIG. 3 is a top view of the ball plug according to the invention;

FIG. 4 is a front view of a ball plug according to the invention;

FIG. 5 is a cut-away side view of the ball valve according to the invention illustrating zero ball travel;

FIG. 6 is a side view of a ball valve according to the invention illustrating the valve after partial ball travel;

FIG. 7 is a side view of the ball valve, according to the invention, illustrating the valve after full ball travel.

DESCRIPTION OF THE PREFERRED EMBODIMENTS

Figure 8:
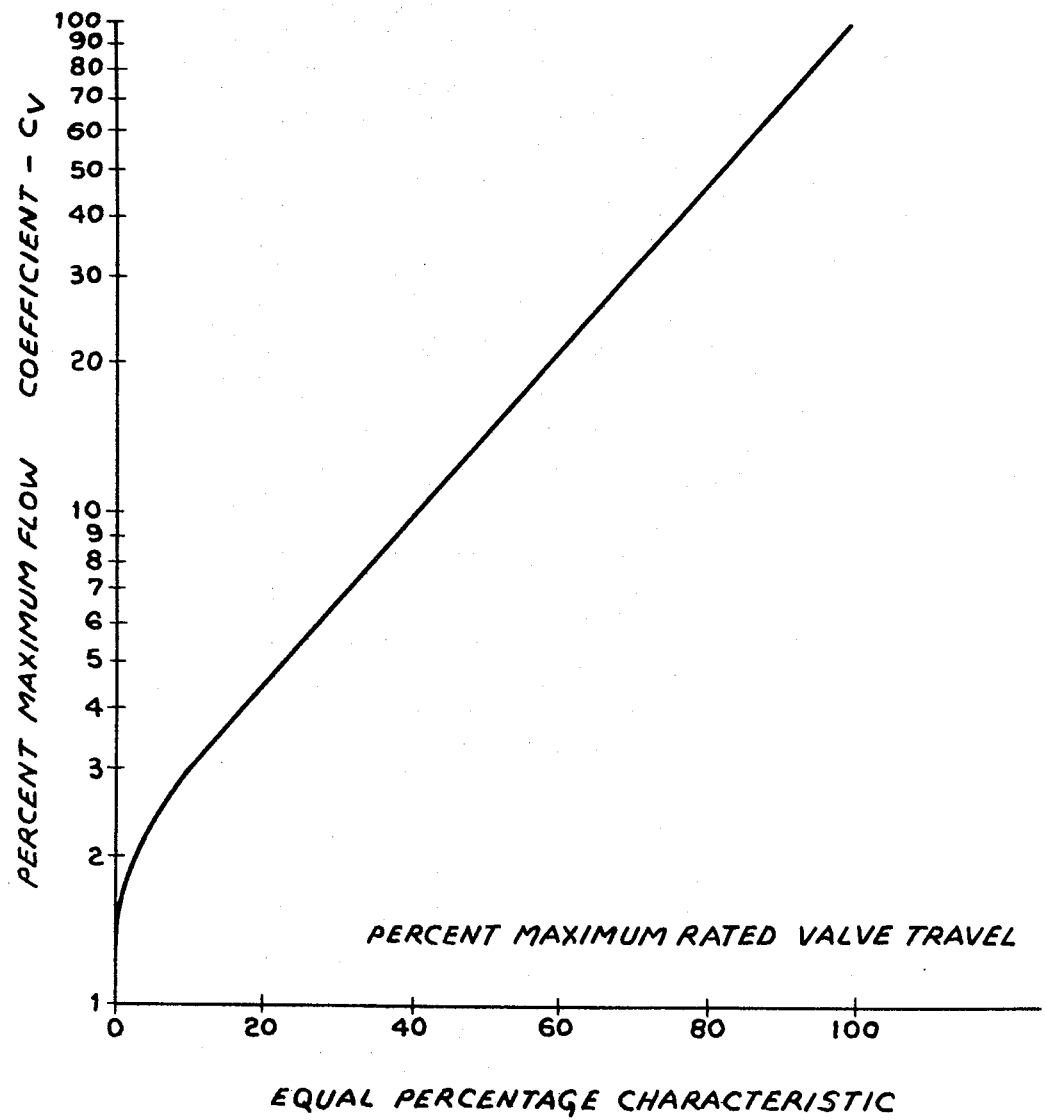
FIG. 8 is a graphical representation of the percentage of fluid flow through the valve versus the percentage of ball travel of the valve constructed according to the invention.

Referring now to FIG. 1 there is shown a ball valve having a casing 1 formed with an inlet pipe 2 and an outlet pipe 3. Inlet pipe 2 is tapered at an angle 4 of approximately 8½° to 9° and is of such a length that circular aperture 5 of pipe 2 has a diameter equal to approximately 83 percent of the diameter of circular aperture 6 of pipe 2. A ball plug 7 is rotatably mounted, in vacant space 8 in casing 1, on trunnions 9 and 10. Plug 7 is coupled to any conventional drive means, for example, motor 20, for rotating plug 7 and thereby varying the characteristic of the valve. This is accomplished by varying the portion of plug 7, which is formed with both an indentation and a circular arc cut-out, which are to be discussed below, which are presented to inlet aperture 5. Plug 7 is further supported in vacant space 8 by circular guide plate 21 which is fitted into a circular seat 22 formed in casing 1. A seating ring 23, which may be made of any standard seating material, for example plastic or metal, is positioned in circular seat 24 formed in casing 1 and a clearance of approximately 0.032 inches is provided between seating ring 23 and the face of plug 7 so that, in a manner which will be more fully explained when the operation of the valve is discussed below, there is some fluid flow when the ball plug is in its maximum cut-off position.

To provide an area for the collection of waste sediment, which is of extreme importance, for example, in nuclear reactors, a trap 11, consisting of a vacant area has been provided. Trap 11 is positioned so that it is in the lowest portion of the valve, i.e., the valve is installed as illustrated in FIG. 1 with trunnion 9 higher than trunnion 10. As fluid flows from inlet pipe 2 toward outlet pipe 3, sediment, which may be in this case radioactive waste, passes through holes, two of which are illustrated at 12 and 13, formed in circular guide plate 21. A drainage hole 14 plugged with a plug 15 is provided in casing 1, and, at appropriate intervals, plug 15 is removed so that the waste which has settled may be removed from trap 11 through drainage hole 14.

Referring now to FIG. 2, there is illustrated a side view of ball plug 7 constructed according to the invention. The plug has a somewhat circular periphery between points 30 and 31 and extends between points 31 and 32 in a straight line. Between points 30 and 31 there is provided an indentation 33 which provides, in part, the equal percentage flow characteristic of the ball valve. The indentation is formed by a plurality of overlapping cones, the apexes of which are joined together and the tangents of which are also joined together. Referring now in greater detail to indentation 33, it is seen that, in this example, 4 cones, 34, 35, 36 and 37 are provided. These cones may be formed, for example, by drills and in the illustration provided, cone 34 is provided by a 1 inch drill and is drilled to a depth of ½ inch, cone 35 is provided by a 1⅛ inches drill and is drilled to a depth of 9/16 of an inch, cone 36 is provided by a 1 9/16 inches drill and is drilled to a depth of 25/32 nds of an inch and cone 37 is provided by a 13/16 inch drill and is drilled to a depth of 13/32nds of an inch. The cone apexes 38, 39, 40 and 41, of cones 34–37, respectively are joined together, as illustrated, by any known method, for example, milling, filing, etc. That is, apex 38 is joined to apex 39 which is joined to apex 40, which is in turn joined to apex 41. It is appropriate to note here that if the size of a valve constructed according to this invention is of a size different than that illustrated, all dimensions provided herein will be varied in a directly proportional manner. As noted above, plug 7 is also provided with a circular arc aperture formed therein and this aperture is provided between points 50 and 32, the dotted line 51 indicating the through characteristic of the circular arc aperture.

Turning now to FIG. 3, there is illustrated a front view of plug 7 showing in greater detail indentation 33, the bases of cones 34–37 being illustrated at 52–55, respectively; i.e. base 52 is 1 inch in diameter while base 55 is 13/16 inch in diameter. As more clearly shown in FIG. 3, the tangents of bases 52–55 of cones 34–37 are joined together at their tangents by any known method, for example, milling or filing, in much the same manner as the apexes 38–41 of the cones were joined together. FIG. 3 also illustrates the top of circular arc aperture 56 which was briefly discussed with regard to FIG. 2.

Turning now to FIG. 4, there is illustrated in greater detail circular arc aperture 56 which is the portion of the plug presented to inlet aperture 5 when plug 7 is rotated to its maximum flow position. Aperture 56 is circular and is centered at 57 and subtends an arc somewhat greater than 180°. In FIG. 4 there is illustrated also the bottom portion of indentation 33 corresponding to cone 34.

Turning now to FIGS. 5, 6 and 7 there is illustrated partially cutaway side views of the valve of the instant invention illustrating successive rotations of plug 7 in casing 1. FIG. 5 illustrates the plug in its maximum closed position when all flow through the valve is dependent on that which may pass through the previously mentioned 0.032 inch clearance between seating ring 23 and plug 7. It should be noted at this point that the clearance between seat 23 and plug 7 is provided primarily to prevent binding, since at the extremely high temperatures which may be reached by the fluid which flows through the valve during its use in conjunction with a nuclear reactor, and due to the different coefficients of thermal expansion of the various materials from which the valve is constructed, there would other wise be binding resulting in difficulty in rotating plug 7 within casing 1. It is thus seen that the spacing between seat 23 and plug 7 will vary in dependence upon the temperature of the fluid flowing through the valve and, therefore, the amount of fluid flowing through the valve due to this spacing will vary. This clearance between the seating ring and the valve is therefore considered to be of minimal significance in determining the flow characteristic of the valve as a whole.

FIG. 6 illustrates the valve plug in a partially rotated position and it is seen that fluid will flow through the valve, while the plug is in this illustrated configuration, due to both indentation 33 and aperture 56, as illustrated by arrows 60, 61 and 62.

Turning now to FIG. 7, there is illustrated the plug of the instant invention in the configuration where the plug is fully rotated and all fluid flow through the valve is due to aperture 56, none of the flow being provided by indentation 33.

The operation of the modulating ball valve will now be described with regard to FIG. 8 which is a graphical representation of the percentage of maximum flow available versus the percentage of maximum plug travel. It will be noted that over the greater portion of the valve characteristic; i.e., from approximately 7–8 percent of valve travel to 100 percent of valve travel, the valve has an "equal percentage" characteristic. By this phrase is meant that a percentage change in valve travel at any point on the characteristic curve will cause an equal percentage change in flow through the valve. For example, it is seen that if the plug is rotated from 40 percent of its maximum travel to 45 percent of its maximum travel, the percentage of flow relative to the maximum available will vary from approximately 9½ percent to 12 percent, an increase of approximately 25 percent. If valve travel is increased from 80 to 85 percent, again a plug rotation of 5 percent, it is seen that the percentage of maximum flow increases from approximately 45 percent to approximately 55 percent, again an increase of approximately 25 percent.

Returning now to the discussion of valve operation, it is seen that with zero valve travel flow is approximately 1½ percent of the maximum available and this is due, as discussed above, to the clearance between seating ring 23 and plug 7; the position of zero valve travel corresponding to that illustrated in FIG. 5. It is seen that in this portion of the curve, i.e., where the percentage of valve travel is less than approximately 7–8 percent, an equal percentage characteristic is not provided. At the point of 7–8 percent of valve travel, the characteristic becomes an equal percentage characteristic and this is the point at which indentation 33 begins to control fluid flow, and that flow due to the clearance between seating ring 23 and plug 7 becomes negligible. Indentation 33 will have an effect on the valve characteristic until approximately 45 percent of valve rotation is reached, and aperture 56 will begin to have an effect on the valve characteristic, i.e., begin to provide a fluid path at approximately 30 percent of valve rotation. Thus, both indentation 33 and aperture 56 will provide fluid flow paths when the plug is rotated to a position between 30 and 45 percent of its maximum allowable travel and FIG. 6 illustrates the condition of approximately 40 percent of the maximum allowable travel of plug 7 where both indentation 33 and aperture 56 are effective, it being clear that if plug 7 is rotated approximately 5 percent more of its maximum allowable rotation, indentation 33 will no longer be effective to provide a fluid path.

Referring again to the graph illustrated in FIG. 8, it is seen that at 100 percent of valve travel, 100 percent of maximum flow is provided through the valve and this condition is illustrated in FIG. 7 where aperture 56 coincides with the aperture provided by seating ring 23 and further rotation will provide no greater fluid path.

While the principles of the invention has been described in connection with specific structure, it is to be clearly understood that this description is made only by way of example and not as a limitation to the scope of the invention, as set forth in the objects thereof and in the accompanying claims.

I claim:

1. A modulating ball valve comprising:
   a valve casing having an inlet aperture and an outlet aperture formed therein; and
   a ball plug having an indentation formed therein rotatably mounted within said casing;
   said indentation being formed by a plurality of overlapping conical cavities of different diameters, whereby the presentation of different portions of said indentation to the periphery of said inlet aperture varies the flow through said valve.

2. A modulating ball valve, according to claim 1, further comprising:
   a conical inlet tube connected to said inlet aperture,
   said inlet tube being tapered to an increasing diameter in a direction away from said inlet aperture and cooperating with the indentation of said ball plug to provide said flow through said valve.

3. A modulating ball valve, according to claim 2, wherein
   the characteristic of the flow through said valve is an equal percentage characteristic.

4. A modulating ball valve, according to claim 1, wherein
   said plug further comprises a circular arc aperture formed therein, said circular arc aperture being displaced from said indentation.

5. A modulating ball valve, according to claim 4, wherein
   said indentation reaches the periphery of said inlet aperture to provide a first flow aperture before said circular arc aperture reaches said periphery as said plug rotates to provide flow through said valve.

6. A modulating ball valve, according to claim 5, wherein
   said circular arc aperture moves toward said periphery to form a second flow aperture as said plug rotates to further open said first flow aperture.

7. A modulating ball valve, according to claim 6, wherein
   said indentation and said circular arc aperture are so positioned that said second flow aperture begins to open before said first flow aperture is fully closed and said first flow aperture is fully closed before said second flow aperture is fully opened.

8. A modulating ball valve, according to claim 7, further comprising:
   a seating ring mounted within said casing adjacent said ball plug,
   said plug and said ring being spaced one from the other so that fluid flow occurs during maximum valve closing.

9. A modulating ball valve, according to claim 1, wherein
   the apexes of said conical cavities are serially joined one to the other.

10. A modulating ball valve, according to claim 1, wherein
    the tangents of the bases of said conical cavities are serially joined one to the other.

* * * * *